(12) United States Patent
Noto

(10) Patent No.: US 7,108,767 B2
(45) Date of Patent: Sep. 19, 2006

(54) PYROLYSIS MACHINE

(76) Inventor: Vincent H. Noto, 2752 Imperial Ave., San Diego, CA (US) 92102

( * ) Notice: Subject to any disclaimer, the term of this patent is extended or adjusted under 35 U.S.C. 154(b) by 60 days.

(21) Appl. No.: 10/921,033

(22) Filed: Aug. 18, 2004

(65) Prior Publication Data

US 2006/0037852 A1 Feb. 23, 2006

(51) Int. Cl.
*C10B 9/00* (2006.01)
(52) U.S. Cl. .......................... 202/96; 202/85; 202/117; 202/270; 202/118; 201/30; 588/321; 588/900
(58) Field of Classification Search ................ 202/96, 202/85, 117, 270, 118; 201/30; 588/321; 588/900; 451/59; 126/410; 165/89; 29/895
See application file for complete search history.

(56) References Cited

U.S. PATENT DOCUMENTS

| | | | |
|---|---|---|---|
| 2,279,577 A * | 4/1942 | Martin ...................... | 4/111.3 |
| 4,172,976 A * | 10/1979 | Namiki et al. .............. | 219/469 |
| 4,269,593 A * | 5/1981 | Faulkner et al. ............ | 432/58 |
| 4,461,674 A * | 7/1984 | Faulkner et al. ............ | 202/85 |
| 5,250,131 A * | 10/1993 | Gitelman .................... | 156/95 |
| 5,294,766 A * | 3/1994 | Brotz ......................... | 219/619 |
| 5,622,037 A * | 4/1997 | Haimer ...................... | 56/16.4 D |
| 6,436,356 B1 * | 8/2002 | Kopyt ........................ | 422/233 |

FOREIGN PATENT DOCUMENTS

CA       2348221       * 11/2000

OTHER PUBLICATIONS

Die Vorleigende Arbeit Wurde Angefertigt am Institut fur Physikalische Chemie der Universitat Hamburg in dem Arbeitskreis VN Herrn Prof. Dr. W. Metz.

Thermal Conversion of Biomass and Waste: The Status AV Bridgewater Bio-Energy Research Group, Aston University.
Pyne IEA Bioenergy Jan. 16, 2004.
Pressnall Technology, Inc. Green Monster.
Tired-Derived Fuel Feb. 12, 2004.
Economic Consideration Relating to TDF Feb. 12, 2004 pp. 1-2.
Industrial Scale Demonstration of the Pyrocycling™ Process for the Conversion of Biomass to Biofuels and Chemicals C.Roy, D. Blanchette Pyrovac Institute, Inc. Jun. 5-9, 2000.
The Ensyn Technology—Biomass Applications Oct. 23, 2000 pp. 1-8.
The Conversion of Wood and Other Biomass to Bio-Oil Ensyn Group, Inc. Jun. 2001.
Vacuum Pyrolysis of Used Tires C. Roy et al. May 1995 pp. 1-9.
The Vacuum Pyrolysis of Used Tires End-Uses for Oil and Carbon Black Products C. Roy et al. Journal of Analytical and Applied Pyrolsis (1999) pp. 201-221.

* cited by examiner

*Primary Examiner*—Glenn Caidarola
*Assistant Examiner*—Alexis Wachtel
(74) *Attorney, Agent, or Firm*—Charmasson, Buchaca & Leach, LLP

(57) ABSTRACT

Useful byproducts are recovered through the pyrolytic processing of biomass material such as vegetation, paper, or worn tires. The process is conducted in a sealed enclosure under vacuum or other controlled atmosphere. The biomass material is ablated and burned by crunching between counter-rotating rollers whose inner walls have been exposed to a highly heated fluid. The biomass material is preheated by injecting into the feeding duct super-heated: dry steam. A condenser within the enclosure reduces resulting vapors into oils that can be drained from the enclosure pan. Solid combustion residue is abstracted from the enclosure by an Archimedes screw.

31 Claims, 3 Drawing Sheets

PYROLYSIS MACHINE

FIELD OF THE INVENTION

This invention relates to pyrolysis, and more particularly to method for pyrolytically processing waste biomass material into useful byproducts.

BACKGROUND OF THE INVENTION

The use of pyrolysis as a means of recovering oil and carbon byproducts by combustion of waste material under vacuum is well-known. An application of this process is described in "The Vacuum Pyrolysis of Used Tires and-Uses for Oil and Carbon Black Products by C. Roy, A. Chaala, and H. Darmstadt—Elsevier Journal of Analytical and Applied Pyrolysis Vol. 51 (1999) p. 201–221" which paper is incorporated into this specification by this reference.

The conventional pyrolytic process involves shedding biomass material into small chips or debris that are then pyrolized under a controlled atmosphere. A common method consists of spreading the debris over a conveyer belt that passes through a high temperature furnace. Debris may also be incinerated by mixing them with super-heated sand. The pyrolized material is then treated chemically or mechanically to extract desired bi-products. The prior art methods require multi-step treatment, including pre-shredding of large articles, through complex equipment at a relatively slow throughput rate.

This invention results from an attempt to devise a simple and more efficient method and apparatus to recover large quantities of useful byproducts from the pyrolysis of a large variety of biomass waste material.

SUMMARY OF THE INVENTION

The principal and secondary objects of this invention are to provide a relatively simple apparatus into which the various processes of ablative pyrolysis can be accomplished in a single and continuous operation which is easily controlled and self-regulating, at a great economy of energy.

These and other valuable objects are achieved by feeding biomass material in an enclosure under vacuum or other controlled atmosphere between counter-rotating rollers that are closely spaced-apart and whose circumferential outer surfaces have been heated by exposure to a hot fluid. The fluid is injected into the interior of the cylinder through an axial duct and extracted therefrom through another duct coaxial with the first one, and directed against the inside surface of each of the cylinder walls by a stationary cylindrical body having an axial intake port and a plurality of peripheral outlets that direct the blast of highly heated fluid, for example, super-heated steam, against the wall of the roller. The biomass material is fed between the rollers through a chute into which super-heated dry steam is injected in order to preheat the material. A condenser in the enclosure turns vaporized oils into liquids that can be drained from the pan of the apparatus. Solid carbon residue are extracted by means of an Archimedes screw at the bottom of the pan.

DESCRIPTION OF THE PREFERRED EMBODIMENTS OF THE INVENTION

Figure 1:
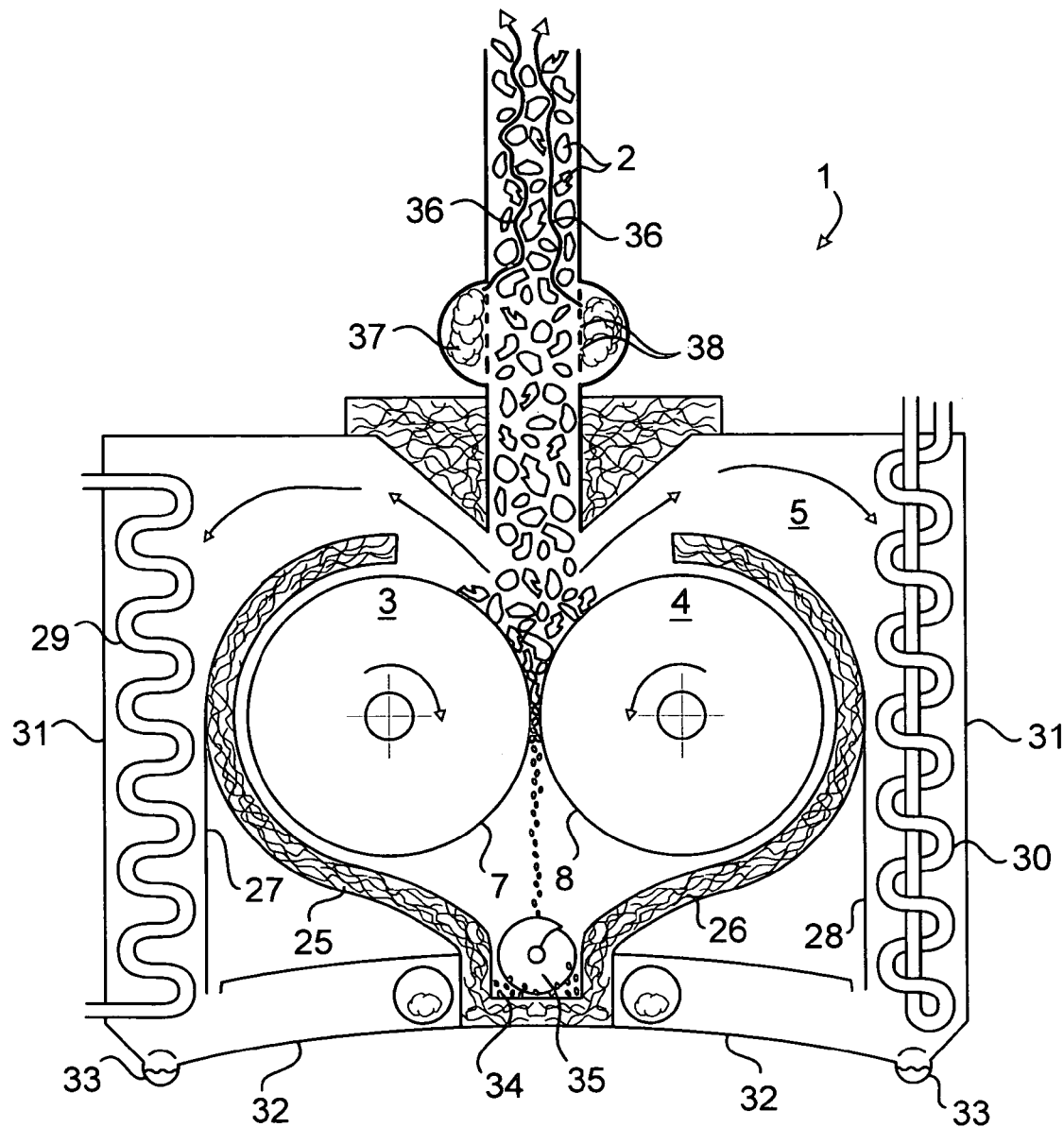
FIG. 1 is a diagrammatic, cross-sectional view of the pyrolysis machine according to the invention.

Referring now to the drawing, there is shown in the diagram of FIG. 1, an apparatus 1 particularly adapted to the practice the ablative pyrolytic process of converting biomass material such as paper, wood chips or other vegetation debris in order to extract from them useful byproducts such as oils or other liquids, and carbon particles and other solids. The biomass material 2 is fed to a pair of counter-rotating crunching rollers 3, 4 held in a sealed enclosure 5. The biomass material is dropped into the enclosure through a chute 6. The rollers are axially parallel and their circumferential outer surfaces 7, 8 are narrowly spaced-apart to grab, crunch and burn the pieces of biomass material. The walls of the rollers are made of a heat-transmitting material, preferably stainless steel and are heated from the inside. The rollers can include electric heating elements, but are preferably exposed to a flow of super-heated gas or highly heated fluid.

Figure 2:
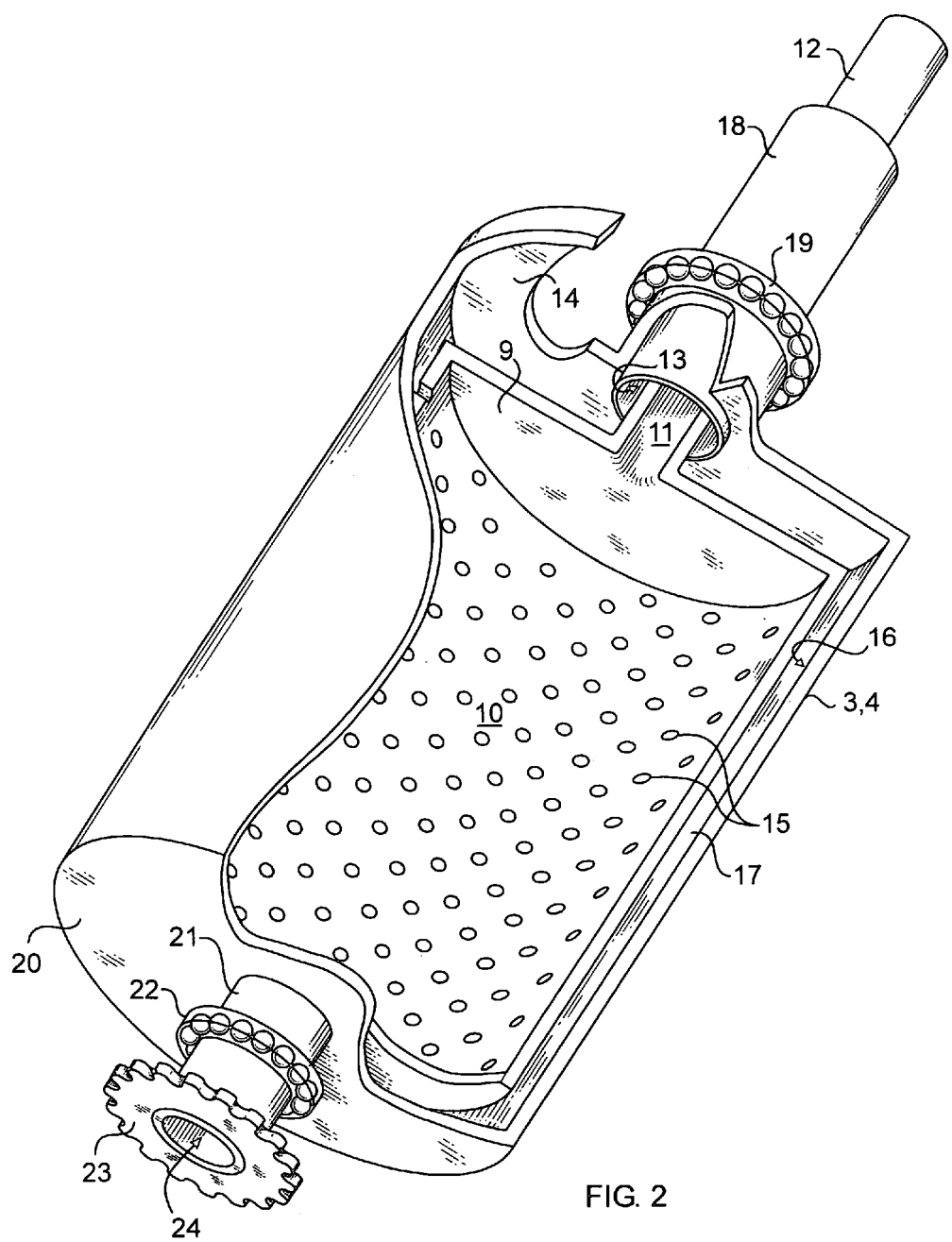
FIG. 2 is a fragmentary, perspective view of a roller-heating mechanism.

As more specifically illustrated in FIG. 2, a cylindrical body 9 is coaxially housed into each roller 3, 4. The cylindrical body does not rotate, but forms a chamber 10 having an axial intake port 11 connected to a duct 12 passing through an axial aperture 13 in one of the end walls 14 of the roller.

The chamber has also a plurality of peripheral outlets or pores 15 which blast a pressurized highly heated fluid admitted through the intake 11 against the inner surface 16 of the roller's circumferential wall. It has been found that this form of impingement heat transfer is highly effective. The highly heated fluid is evacuated from the space 17 between the cylindrical body 9 and the roller wall inner surface 16 by way of an exit conduit 18 coaxially surrounding the intake duct 12. The end wall 14 of the roller is rotatively supported by a water-cooled roller bearing 19 fitted around the exit conduit 18. The opposite end wall 20 of the roller is welded to an axial shaft 21 supported by an outer structure (not shown in the drawing) by another roller bearing 22. The shaft mounts a sprocket wheel 23 engaging a chain that drives the roller. Alternately or additionally, another exit conduit 24 can be formed through the axial shaft 21 in communication with a second axial aperture formed through the opposite end wall 20 of the roller.

The highly heated fluid is preferably super-heated steam or highly heated oil or molten salt which is heated to a temperature calculated to incinerate the biomass material over a range of approximately 400 degrees to 1,000 degrees Celsius in a boiler (not shown in the drawing). Turbulences are preferably imparted in the highly heated fluid in order to maximize the heat transfer to the roller. Super-heated steam is used as the fluid in this preferred embodiment.

As shown in the diagram of FIG. 1, the outer peripheries of the rollers are surrounded by hemispherical heat shields 25, 26 supported by brackets 27, 28 welded at their bases to the floor of the enclosure 5. Sets of condenser coils 29, 30 into which a cooling fluid is circulated, are positioned between the heat shields and the side walls 31 of the enclosure. The coils cause vaporized fluids such as oil which emanates from the burning biomass material to condense into a liquid which is continuously drained from the bottom pan 32 of the enclosure through appropriate ports 33 and conduits.

Pulverized or solid residue from the combustion of the biomass material fall into a trough 34 from which they are extracted by a Archimedes screw 35.

As indicated by the arrows 36 flow of dry, super-heated steam 37 is injected into the chute 2 through radial apertures 38 in order to preheat the biomass material. The material is preferably packed and fed loosely to the device in order to allow easy and efficient circulation of the heating steam therethrough. The steam is allowed to escape up the chute. It should be understood that the super-heated, dry steam can be the same fluid that is used for heating the rollers and is fed to the chute from the exit ports 18 of the rollers.

The enclosure 5 may be subject to a vacuum or to any other type of controlled and regulated atmosphere in order to accommodate a variety of biomass material. The atmosphere may be formulated and adjusted to trigger a specific chemical reaction during the pyrolysis process.

Figure 3:
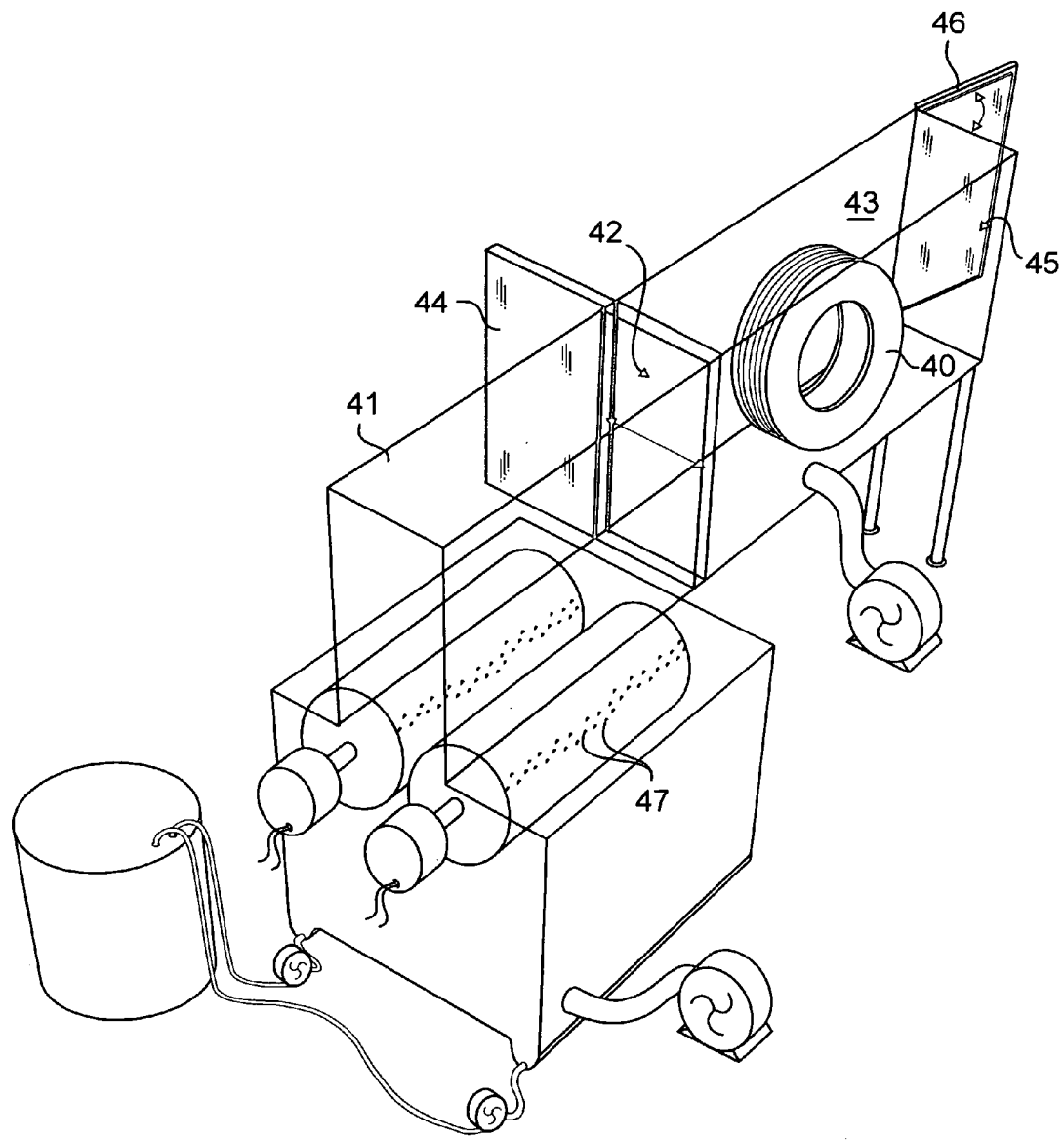
FIG. 3 is a perspective view of a pyrolysis machine adapted to the processing of reclaimed tires.

As illustrated in the diagram of FIG. 3, whole, bulky articles such as the illustrated worn tire 40 may be processed by an adaptation of the above-described apparatus. In this case, the chute is replaced by a box 41 connected through a closable passageway 42 to a conditioning chamber 43 large enough to accommodate at least one tire. With the passageway hermetically closed by a sliding gate 44 the tire is introduced into the box through a feeding opening 45. A door 46 closing the opening is hermetically sealed, and the atmosphere within the box is brought to the same control conditions as the enclosure of the apparatus. When the chamber and the enclosure are in equilibrium, the sliding gate 44 is withdrawn and the tire allowed to roll under gravity and drop toward the rollers. It should be noted that no pre-shredding of the tire is required.

In order to facilitate the ablation of the tire or other biomass material, the outer peripheral surfaces 7,8 of the rollers are provided with indentations 47 which are interspaced from one roller to the other. More friction and shredding action is obtained by running the rollers at slightly different speeds from one another. At least one of the rollers may be supported by a resilient structure that allows for slight and momentary separation of the rollers when they grab a non-frangible pieces of material.

The rotation of each roller is independent from the other so that not only the speed, but also the direction of rotation may be separately altered to maximize ablation or to clear obstructing matter.

For best results, wood chips and other vegetable material should have a water content not exceeding approximately 15% per weight. When the heated gas is brought from the rollers into the chute it is still in a super-heated condition but to a lesser degree than when fed to the heating bodies of the rollers. When fed at the base of the chute close to the rollers, the heated gas helps dry and pre-condition the incoming chips, and, at the same time generates a large plume of low temperature steam that drives out any air that is being carried in with the chips. Addition of a small amount of nitrogen gas helps remove any entering oxygen. The dried wood chips now devoid of contaminating oxygen drop out of the chute and accumulate against the rotating rollers at a feeding rate that can be set as a function of the temperature, speed of rotation and the rate of ablation of the wood stock being processed. This feeding method is by design self-regulating, where no special regulating control is needed.

The ratio of recovered bio-oils and gases, such as methane, carbon monoxide and hydrogen can be modified by adjusting the atmospheric pressure within the chamber, the temperature of the rollers and the degree of preheating. Lower temperatures tend to favor the extraction of organic acids such as formic and acidic acids or alcohols. An halogen atmosphere can yield halogenated bio-oils. Non-condensing gases that accumulate within the enclosure can be collected and exploited as a source or heat or pressure or used in some combustion device to produce energy. The powder or solid residue which is collected at the bottom of the enclosure will include activated carbon. This product is also dependent upon the biomass material condition and the reaction temperature being used and may not need further processing. The carbon residue can also be heated with sulfuric acid to produce carbon disulfide and hydrogen.

It should also be noted that the use of burning rollers avoids the need of pre-shredding tires and other such items prior to feeding into the pyrolysis apparatus. Sifting equipment can be used to separate metallic components such as tire belts from carbon residue according to methods well-known to the mechanical arts.

While the preferred embodiments of the invention have been disclosed, modifications can be made and other embodiments may be devised without departing from the spirit of the invention and the scope of the appended claims.

What is claimed is:

1. An apparatus, for pyrolytic processing of biomass material into useful byproducts, which comprises:
   an enclosure;
   a pair of axially parallel, rotating rollers in said enclosure, said rollers being narrowly spaced-apart to grab and crunch said biomass material fed therebetween;
   means for rotating said rollers;
   means for heating said rollers to an incinerating temperature;
   means for feeding said biomass material between said rollers; and,
   means for extracting said byproducts from said enclosure;
   wherein said means for heating comprise means for circulating a continuous flow of highly heated fluid within said rollers; and,
   wherein said means for circulating comprise:
   each of said rollers having a circumferential wall made of heat-conducting material, and having inner and outer circumferential surfaces;
   a body coaxially mounted within said roller in close proximity to said circumferential wall, said body having a plurality of peripheral outlets and at least one intake port; and
   means for passing said highly-heated fluid through said intake port and out said outlets against said inner circumferential surface.

2. The apparatus of claim 1, wherein said means for passing comprise
   first conduit means for injecting said highly heated fluid into said body through an axial aperture in said roller; and
   second conduit means for drawing said highly heated fluid out of said roller.

3. The apparatus of claim 2, wherein said means for passing further comprise said second conduit means being formed through a second axial aperture in said roller.

4. The apparatus of claim 2, wherein said means for passing further comprise said second conduit means coaxially surrounding said first conduit means through said aperture.

5. The apparatus of claim 1, wherein said means for extracting comprises:
   means for condensing hot combustion gases into liquids; and
   means for drawing said liquids out of the enclosure.

6. The apparatus of claim 1, wherein said means for extracting further comprise means for extracting combustion residue from said enclosure.

7. The apparatus of claim 6, wherein said means for extracting comprise an Archimedes screw.

8. The apparatus of claim 1, wherein said means for feeding comprise:
a chute having an exit above the space between said rollers; and
means for feeding dry heated steam into said chute;
whereby the biomass material is preheated by said steam into said chute before dropping between the rollers.

9. The apparatus of claim 1, wherein said means for rotating comprise means for turning said rollers in opposite directions from each other, and at slightly different speeds.

10. The apparatus of claim 1, wherein said enclosure is hermetically sealed;
whereby said processing can be performed under controlled atmosphere.

11. The apparatus of claim 10, which further comprises:
an hermetically sealable chamber adjacent to said enclosure;
a closable passageway between said enclosure and chamber; and
means for adjusting the atmosphere in said chamber to that of said enclosure;
whereby biomass material can be placed into said chamber, the chamber sealed, and its atmosphere adjusted before opening said passageway and admitting said biomass material into said enclosure.

12. A pyrolytic method for converting biomass material into useful byproducts, which comprises:
ablating and pyrolizing said biomass material between highly heated, counter-rotating crunching rollers; wherein each of said rollers comprises a circumferential wall made of heat-conducting material, and having inner and outer circumferential surfaces; and a body coaxially mounted within said roller in close proximity to said circumferential wall, said body having a plurality of peripheral outlets and at least one intake port; and,
wherein said ablating and pyrolizing comprises passing a highly-heated fluid through said intake port and out said outlets, and thereby impinging against said inner circumferential surface.

13. The method of claim 12, wherein said ablating and pyrolizing further comprises turning said rollers at slightly different speeds.

14. The method of claim 12, wherein said ablating and pyrolizing further comprises turning said rollers in an opposite rotational direction, whereby an obstruction is cleared.

15. The method of claim 12, which further comprises conducting said ablating in a sealed enclosure under a controlled atmosphere.

16. The method of claim 15, which further comprises conducting said ablating under vacuum.

17. The method of claim 15, which further comprises condensing vaporized fluids present in said enclosure.

18. The method of claim 12, which further comprises:
feeding said biomass material to said rollers through a chute; and
injecting hot dry steam into said chute to preheat said biomass material.

19. The method of claim 12, which further comprises imparting turbulences into said highly heated fluid.

20. The method of claim 15, wherein said conducting comprises formulating and adjusting said atmosphere to achieve a specific chemical reaction during said converting.

21. The method of claim 12, wherein said highly heated fluid is taken from a group essentially consisting of superheated steam, highly heated molten salts, and highly heated oils.

22. An apparatus, for pyrolytic processing of biomass material into useful byproducts, which comprises:
first and second axially parallel rollers, said rollers being narrowly spaced-apart to grab and crunch said biomass material fed therebetween;
wherein said first roller comprises:
a circumferential wall made of heat-conducting material, said wall having inner and outer circumferential surfaces;
a body coaxially mounted within said first roller in close proximity to said circumferential wall, said body having a plurality of peripheral outlets and at least one intake port; and
a source of highly-heated fluid passing through said intake port and out said outlets, and thereby impinging against said inner circumferential surface.

23. The apparatus of claim 22, wherein said first and second rollers are counter-rotating.

24. The apparatus of claim 22, wherein said first roller rotates independently from said second roller.

25. The apparatus of claim 22, wherein said first roller rotates at a different speed than said second roller.

26. The apparatus of claim 22, which further comprises:
means for condensing hot combustion gases into liquids; and
means for drawing said liquids out of the enclosure.

27. The apparatus of claim 22, which further comprises means for extracting combustion residue from said enclosure.

28. The apparatus of claim 27, wherein said means for extracting comprise an Archimedes screw.

29. The apparatus of claim 22, which further comprises means for feeding said biomass material between said rollers, wherein said means for feeding comprise:
a chute having an exit above the space between said rollers; and
means for feeding dry heated steam into said chute;
whereby the biomass material is preheated by said steam into said chute before dropping between the rollers.

30. The apparatus of claim 22, which further comprises;
an hermetically sealed enclosure enclosing said rollers;
whereby said processing can be performed under a controlled atmosphere.

31. The apparatus of claim 30, which further comprises:
an hermetically sealable chamber adjacent to said enclosure;
a closable passageway between said enclosure and chamber; and
means for adjusting the atmosphere in said chamber to that of said enclosure;
whereby biomass material can be placed into said chamber, the chamber sealed, and its atmosphere adjusted before opening said passageway and admitting said biomass material into said enclosure.

* * * * *